United States Patent
Bocking

(10) Patent No.: US 8,374,862 B2
(45) Date of Patent: Feb. 12, 2013

(54) METHOD, SOFTWARE AND DEVICE FOR UNIQUELY IDENTIFYING A DESIRED CONTACT IN A CONTACTS DATABASE BASED ON A SINGLE UTTERANCE

(75) Inventor: Andrew Douglas Bocking, Waterloo (CA)

(73) Assignee: Research In Motion Limited, Waterloo (CA)

( * ) Notice: Subject to any disclaimer, the term of this patent is extended or adjusted under 35 U.S.C. 154(b) by 908 days.

(21) Appl. No.: 11/468,479

(22) Filed: Aug. 30, 2006

(65) Prior Publication Data

US 2008/0059172 A1 Mar. 6, 2008

(51) Int. Cl.
*G10L 15/26* (2006.01)
*G10L 17/00* (2006.01)
*G10L 15/00* (2006.01)
*G10L 11/00* (2006.01)
*G10L 21/00* (2006.01)
*G06F 17/27* (2006.01)
*G06F 17/21* (2006.01)

(52) U.S. Cl. .............. 704/235; 704/9; 704/10; 704/246; 704/251; 704/257; 704/270; 704/270.1; 704/275

(58) Field of Classification Search .............. 704/9, 270, 704/275, E15.024, 270.1, 246, 251, 10, 235, 704/257; 379/88.02, 88.03, 88.04
See application file for complete search history.

(56) References Cited

U.S. PATENT DOCUMENTS

| | | | | |
|---|---|---|---|---|
| 4,777,600 A | * | 10/1988 | Saito et al. | 715/234 |
| 5,752,230 A | | 5/1998 | Alonso-Cedo | |
| 6,163,767 A | * | 12/2000 | Tang et al. | 704/231 |
| 6,192,337 B1 | | 2/2001 | Ittycheriah et al. | |
| 6,269,335 B1 | * | 7/2001 | Ittycheriah et al. | 704/270 |
| 6,418,328 B1 | | 7/2002 | Shon | |
| 6,421,672 B1 | * | 7/2002 | McAllister et al. | 1/1 |
| 6,714,631 B1 | * | 3/2004 | Martin et al. | 379/88.02 |
| 6,901,255 B2 | | 5/2005 | Shostak | |

(Continued)

FOREIGN PATENT DOCUMENTS

EP 1 220 518 A2 3/2002
EP 1 197 951 A2 4/2002

(Continued)

OTHER PUBLICATIONS

Via Voice Directory Dialer Implementation Guide, p. 36, http://www.redbooks.ibm.com/redbooks/pdfs/sg245281.pdf.

(Continued)

*Primary Examiner* — Edgar Guerra-Erazo

(57) ABSTRACT

A single utterance having a name portion and a qualifier portion is received. The name portion represents a spoken name of a desired contact of a contacts database, and the qualifier portion represents a spoken word or words for disambiguating the name of the desired contact from any homophone names in the contacts database. From the utterance, a digital name representation corresponding to the name portion and a digital qualifier representation corresponding to the qualifier portion are generated. The digital representations may be textual or phonetic representations for example and may result from conversion of the utterance to a digital utterance representation and a parsing of the digital utterance representation. The digital name and qualifier representations are processed to uniquely identify the desired contact within the contacts database. The utterance may contain a disambiguation field identifier portion which facilitates the identification of a disambiguation field.

20 Claims, 3 Drawing Sheets

U.S. PATENT DOCUMENTS

| | | | |
|---|---|---|---|
| 6,925,154 B2 * | 8/2005 | Gao et al. | 379/88.03 |
| 6,947,539 B2 | 9/2005 | Graham et al. | |
| 6,961,695 B2 * | 11/2005 | Lawrence | 704/10 |
| 7,013,280 B2 * | 3/2006 | Davis et al. | 704/270 |
| 7,050,560 B2 | 5/2006 | Martin et al. | |
| 7,085,716 B1 * | 8/2006 | Even et al. | 704/235 |
| 7,096,232 B2 * | 8/2006 | Doss et al. | 1/1 |
| 7,181,387 B2 * | 2/2007 | Ju et al. | 704/9 |
| 7,200,555 B1 * | 4/2007 | Ballard et al. | 704/235 |
| 7,299,181 B2 * | 11/2007 | Ju et al. | 704/257 |
| 7,769,592 B2 * | 8/2010 | Kemble et al. | 704/275 |
| 7,991,608 B2 * | 8/2011 | Johnson et al. | 704/9 |
| 2002/0128831 A1 * | 9/2002 | Ju et al. | 704/231 |
| 2006/0004572 A1 * | 1/2006 | Ju et al. | 704/243 |
| 2006/0136195 A1 * | 6/2006 | Agapi et al. | 704/4 |
| 2006/0247915 A1 * | 11/2006 | Bradford et al. | 704/1 |
| 2007/0143100 A1 * | 6/2007 | Agapi et al. | 704/9 |

FOREIGN PATENT DOCUMENTS

| | | | |
|---|---|---|---|
| WO | WO 99/16051 | * | 4/1999 |

OTHER PUBLICATIONS

Naranjo, Verna Perry Rosa, Credle, Rufus and John Lauria. IBM ViaVoice Directory Dialer Implementation Guide published Feb. 29, 2000, http://www.redbooks.ibm.com/redbooks/pdfs/sg245281.pdf, p. 36.

* cited by examiner

METHOD, SOFTWARE AND DEVICE FOR UNIQUELY IDENTIFYING A DESIRED CONTACT IN A CONTACTS DATABASE BASED ON A SINGLE UTTERANCE

FIELD OF TECHNOLOGY

The present disclosure pertains to speech signal processing and databases, and more particularly to a method, software and device for uniquely identifying a desired contact in a contacts database based on a single utterance.

BACKGROUND

It is not uncommon for contemporary electronic computing devices, such as desktop computers, laptop or notebook computers, portable digital assistants (PDAs), two-way paging devices, mobile telephones, and the like, to host a personal information manager (PIM) software application. A PIM software application is a computer program which allow a user to maintain and organize various types of personal information. PIM software applications often incorporate a contacts database for storing and organizing contact information. The contacts database, which may be referred to as a "contact manager" or "address book", typically contains one record for each personal or business contact whose information is being maintained. Each record may have such data fields as first name, last name, company name, department, address, city, state or province, country, zip or postal code, email address, and multiple telephone numbers (home, work, mobile and facsimile for example). A contacts database may alternatively be a standalone application that is not part of a PIM software application.

It is possible for a contacts database to contain one or more records with homophone names. A homophone name is a name that is pronounced like another contact's name but represents a different person. A homophone name may be spelled the same as, or differently from, a desired contact name. For example, the names "John Smith", "Jon Smith", and "John Smythe" (of three different individuals) are each homophones of the name "John Smith" (of a fourth individual).

A conventional automatic voice recognition (VR) engine, as may be used in a speaker-independent voice-activated dialing (SI-VAD) system for example, may address the problem of homophone names in an associated contacts database by requesting further information to resolve an ambiguity, i.e., to "disambiguate" an uttered name and thereby identify the desired person. For example, the user may be informed via aural prompts that the system has more than one person with the name "John Smith". The system may proceed to state (via a text-to-speech capability) the names and respective telephone numbers of the persons, and may ask the user to select one of the persons (e.g., through touch tone key selection). Upon identification of the appropriate person in this manner, a telephone number associated with the identified person may be automatically dialed. Disadvantageously, undesirable delay may be introduced when a user is required to not only initially utter a desired contact name, but to wait for and respond to one or more prompts for further input for use in disambiguating the name. A solution which obviates or mitigates this disadvantage would be desirable.

DETAILED DESCRIPTION

In one aspect of the below-described embodiment, there is provided a method comprising: receiving a single utterance having a name portion and a qualifier portion, the name portion representing a spoken name of a desired contact of a contacts database, the qualifier portion representing a spoken word or words for disambiguating the name of the desired contact from any homophone names in the contacts database; generating from the utterance a digital name representation corresponding to the name portion and a digital qualifier representation corresponding to the qualifier portion; and processing the digital name representation and the digital qualifier representation to uniquely identify the desired contact within the contacts database.

In another aspect of the below-described embodiment, there is provided a machine-readable medium comprising: machine-executable code for receiving a single utterance having a name portion and a qualifier portion, the name portion representing a spoken name of a desired contact of a contacts database, the qualifier portion representing a spoken word or words for disambiguating the name of the desired contact from any homophone names in the contacts database; machine-executable code for generating from the utterance a digital name representation corresponding to the name portion and a digital qualifier representation corresponding to the qualifier portion; and machine-executable code for processing the digital name representation and the digital qualifier representation to uniquely identify the desired contact within the contacts database.

In yet another aspect of the below-described embodiment, there is provided a computing device comprising: a processor; and memory in communication with said processor storing: machine-executable code for receiving a single utterance having a name portion and a qualifier portion, the name portion representing a spoken name of a desired contact of a contacts database, the qualifier portion representing a spoken word or words for disambiguating the name of the desired contact from any homophone names in the contacts database; machine-executable code for generating from the utterance a digital name representation corresponding to the name portion and a digital qualifier representation corresponding to the qualifier portion; and machine-executable code for processing the digital name representation and the digital qualifier representation to uniquely identify the desired contact within the contacts database.

Figure 1:
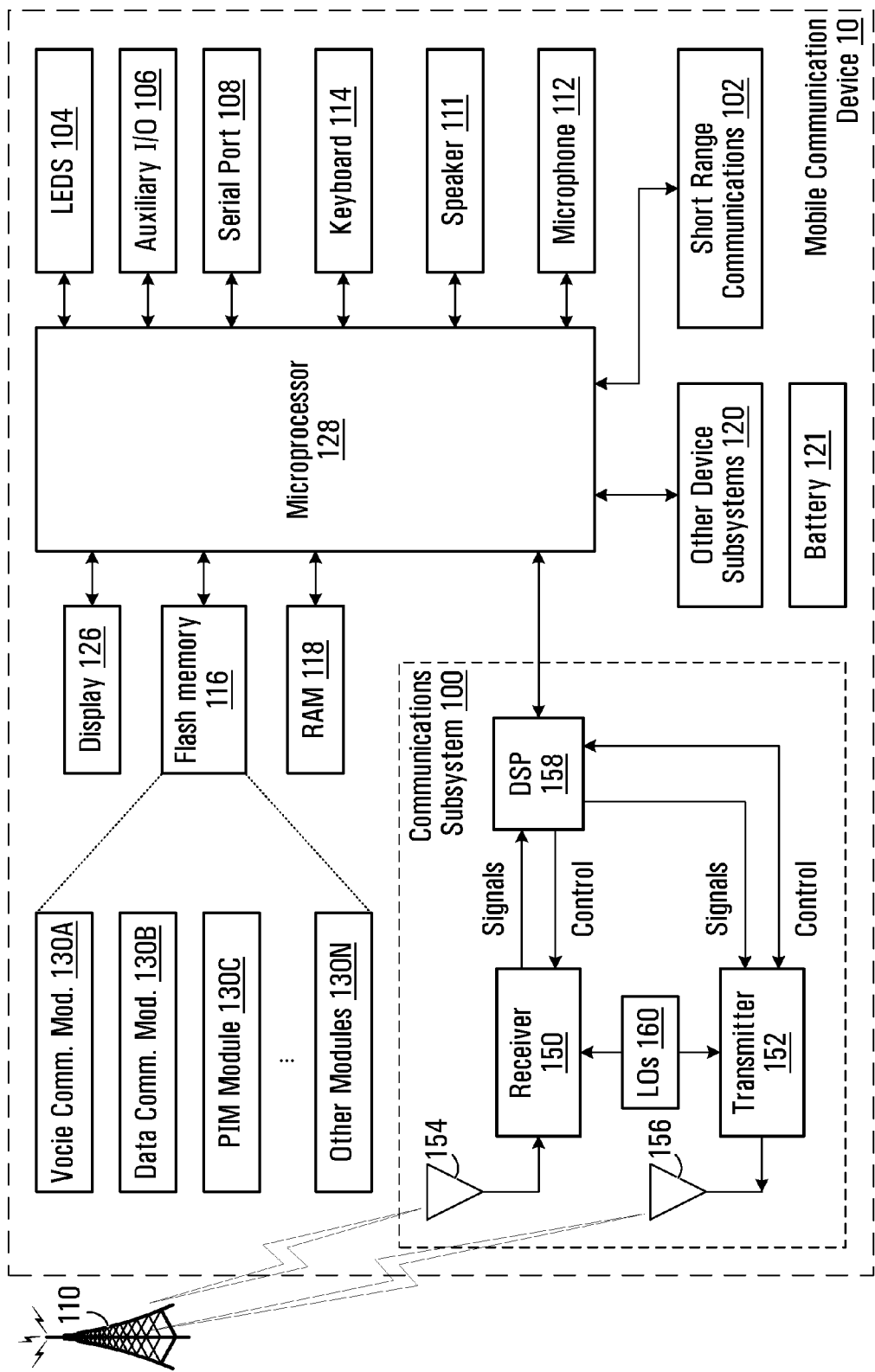
FIG. 1 is a schematic diagram illustrating an exemplary wireless communication device.

FIG. 1 illustrates a hand-held wireless communication device 10 (a form of computing device) including a housing, an input device, a keyboard 114, and an output device—a display 126—which may be a full graphic LCD. Other types of output devices may alternatively be utilized. A microprocessor 128 (which may also be referred to simply as a "processor") is shown schematically in FIG. 1 as coupled between the keyboard 114 and the display 126. The processor 128 controls the operation of the display 126, as well as the overall operation of the mobile device 10, in response to actuation of keys on the keyboard 114 by the user.

In addition to the microprocessor 128, other parts of the mobile device 10 are shown schematically in FIG. 1. These include: a communications subsystem 100; a short-range communications subsystem 102; the keyboard 114 and the display 126, along with other input/output devices including a set of auxiliary I/O devices 106, a serial port 108, a speaker 111 and a microphone 112; as well as memory devices including a flash memory 116 and a Random Access Memory (RAM) 118; and various other device subsystems 120. The device 10 may have a battery 121 to power the active elements of the device. The wireless communication device 10 is may be a two-way RF communication device having voice and data communication capabilities.

Operating system software executed by the microprocessor 128 may be stored in a persistent store, such as the flash memory 116, or alternatively may be stored in other types of memory devices, such as a read only memory (ROM) or similar storage element. In addition, system software, specific device applications, or parts thereof, may be temporarily loaded into a volatile store, such as the RAM 118. Communication signals received by the mobile device may also be stored to the RAM 118.

The microprocessor 128, in addition to performing its operating system functions, executes of software applications (computer programs) 130A-130C on the device 10. A predetermined set of applications that control basic device operations, such as voice and data communications modules 130A and 130B, may be installed on the device 10 during manufacture. The voice communication module 130A of the present embodiment incorporates a voice recognition engine (not shown in FIG. 1). Also installed during or after manufacture is a personal information manager (PIM) application 130C for storing and organizing personal information. The PIM application 130C incorporates a contacts database (not shown in FIG. 1). The contacts database 210 is not necessarily a conventional database (although it could be a conventional database in some embodiments). As will be described in more detail below in conjunction with FIG. 2, the voice recognition engine and contacts database cooperate to support speaker-independent voice-activated dialing (SI-VAD) at the device 10. Additional software modules, illustrated as software modules 130N, may be installed during or after manufacture.

Communication functions, including data and voice communications, are performed by device 10 through the communication subsystem 100, and possibly through the short-range communications subsystem 102. The communication subsystem 100 includes a receiver 150, a transmitter 152, and one or more antennas 154 and 156. In addition, the communication subsystem 100 also includes a processing module, such as a digital signal processor (DSP) 158, and local oscillators (LOs) 160. The specific design and implementation of the communication subsystem 100 is dependent upon the communication network in which the mobile device 10 is intended to operate. For example, the communication subsystem 100 of the mobile device 10 may be designed to operate with the General Packet Radio Service (GPRS) mobile data communication networks and may also be designed to operate with any of a variety of voice communication networks, such as Advanced Mobile Phone Service (AMPS), Time Division Multiple Access (TDMA), Code Division Multiple Access (CDMA), Personal Communication Services (PCS), Global System for Mobile communication (GSM), third generation (3G) wireless and/or Universal Mobile Telecommunications Standard (UMTS). Other types of data and voice networks, both separate and integrated, may also be utilized with the mobile device 10.

When any required network registration or activation procedures have been completed, the wireless communication device 10 may send and receive communication signals over the communication network 110. Signals received from the communication network 110 by the antenna 154 are routed to the receiver 150, which provides for signal amplification, frequency down conversion, filtering, channel selection, etc., and may also provide analog-to-digital conversion. Analog-to-digital conversion of the received signal allows the DSP 158 to perform more complex communication functions, such as demodulation and decoding. In a similar manner, signals to be transmitted to the network 110 are processed (e.g. modulated and encoded) by the DSP 158 and are then provided to the transmitter 152 for digital-to-analog conversion, frequency up conversion, filtering, amplification and transmission to the communication network 110 (or networks) via the antenna 156.

In a data communication mode, a received signal, such as a text message or web page download, is processed by the communication subsystem 100 and is input to the microprocessor 128. The received signal is then further processed by the microprocessor 128 for an output to the display 126, or alternatively to some other auxiliary I/O devices 106. A device user may also compose data items, such as email messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 100.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the device 10. In addition, the display 126 may also be utilized in voice communication mode, for example to display the identity of a calling party, the duration of a voice call, or other voice call related information.

The short-range communications subsystem 102 enables communication between the mobile device 10 and other proximate systems or devices, which need not necessarily be similar devices. For example, the short-range communications subsystem may include an infrared device and associated circuits and components, or a Bluetooth™ communication module to provide for communication with similarly-enabled systems and devices.

Figure 2:
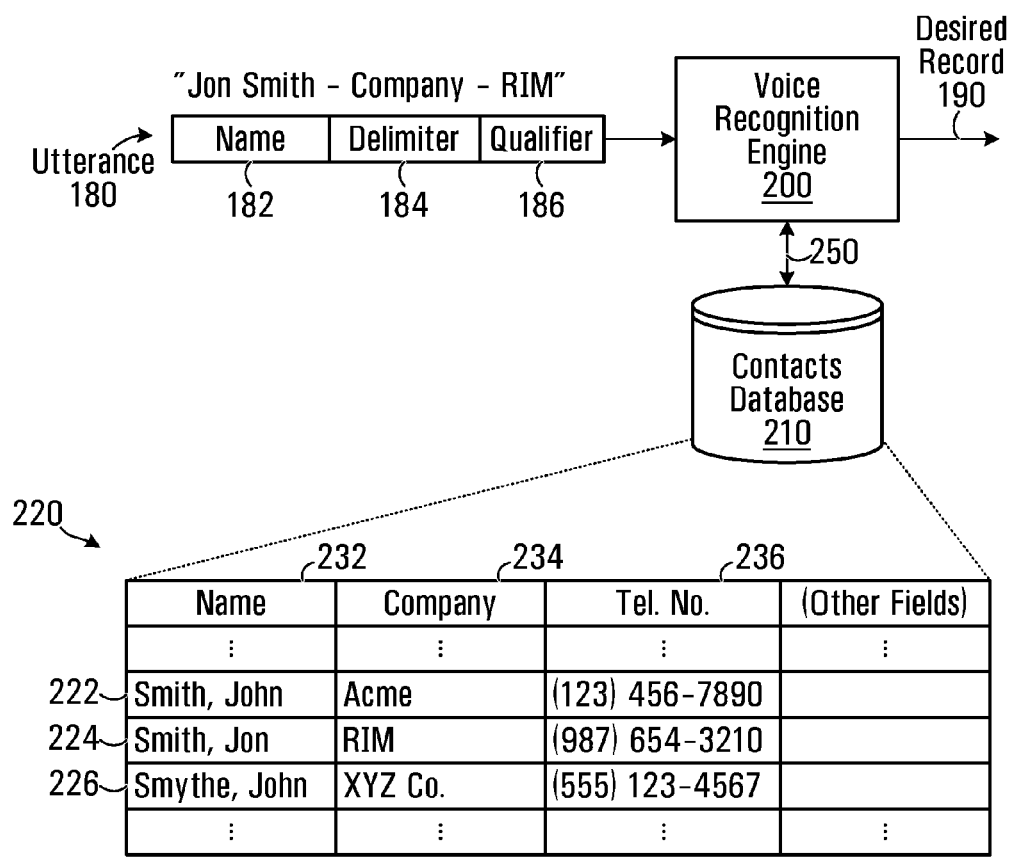
FIG. 2 is a schematic diagram illustrating a voice recognition engine and a contacts database stored in memory of the wireless communication device of FIG. 1.

FIG. 2 illustrates the voice recognition engine 200 of voice communication module 130A and contacts database 210 of PIM application 130C in greater detail.

The voice recognition engine 200 is a computer program which receives an utterance 180 from a user and applies a speech recognition algorithm upon the utterance in order to recognize the spoken words. The voice recognition engine 200 may apply one of a number of voice recognition algorithms or techniques for recognizing the spoken words, as will be described. Based on the recognized words, the voice recognition engine 200 identifies a desired contact within contacts database 210. The voice recognition engine 200 interacts with a contacts database 210, as represented by arrow 250, to identify the desired contact. A record associated with the desired contact is returned for use in initiating a communication with the desired contact.

The computer program comprising the voice recognition engine 200 may be in the form of machine-executable code, which may be downloaded to the wireless communication device 10 (e.g. by way of an over-the-air (OTA) download over the communication network 110). The machine-executable code may originate from a machine-readable medium which is read by a server in communication with the network 110 (not illustrated). The voice recognition engine 200 may form part of a commercially-available application suite including multi-modal voice dialing, message addressing, and voice command capabilities, such as VSuite™ from VoiceSignal Technologies, Inc.

As shown in FIG. 2, the utterance 180 to be processed includes a name portion 182, a disambiguation field identifier portion 184, and a qualifier portion 186. The name portion 182 is the spoken name of the desired contact. The disambiguation field identifier portion 184 is a spoken word or words identifying a database field to be used to disambiguate the spoken name from any homophone names in the contacts database 210. As will be described later, the disambiguation field identifier portion 184 may be omitted in some embodiments. The qualifier portion 186 is a spoken word or words which serves to disambiguate the name of the desired contact from any homophone names in the contacts database 210. For example, if the utterance is "Jon Smith—Company—RIM", the name, disambiguation field identifier, and qualifier portions 182, 184 and 186 of the utterance would be "Jon Smith", "Company", and "RIM", respectively.

The desired record 190 is a record from contacts database 210. The record 190 stores, in one of its fields, a communication address 190 which is used by the voice communication module 130A (FIG. 1) to initiate a communication with the desired contact. The desired record 190 may be one of the exemplary set of records 220 illustrated in FIG. 2. Each record 222, 224 and 226 of the set 220 has a common set of fields, including a name field 232, a company field 234, a telephone number (a form of communication address) field 236, and other fields. As will be appreciated, each of the names in the name field 232 of records 222, 224 and 226 is a homophone name for each of the other names of the set. As will become apparent, unique values in the company field 234 will be used in the present embodiment to disambiguate the names.

Figure 3:
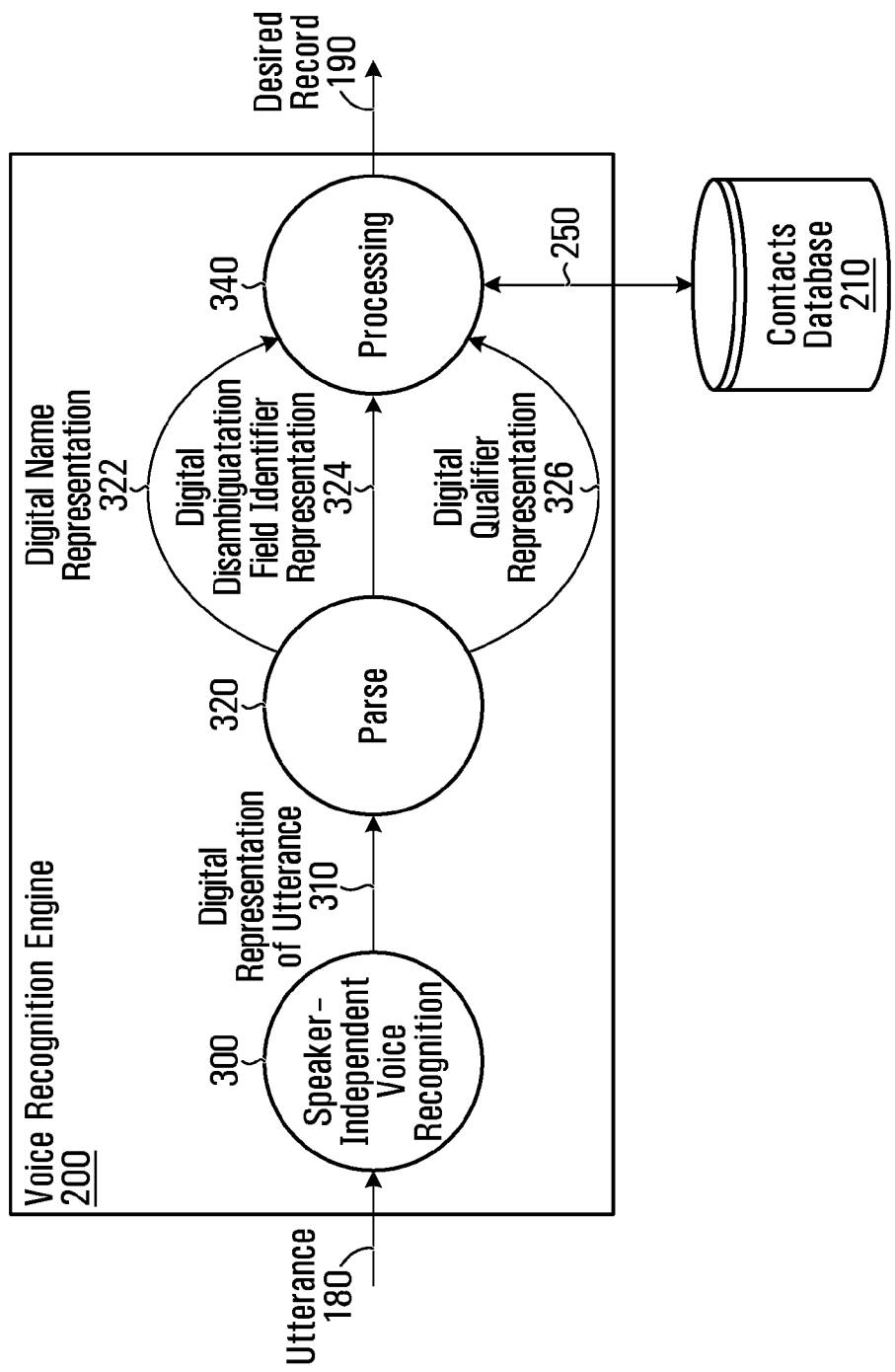
FIG. 3 is a data flow diagram illustrating data flow and processing within the voice recognition engine of FIG. 2.

FIG. 3 is a data flow diagram illustrating data flow and processing within the exemplary voice recognition engine 200 of FIG. 2. In operation, a user desirous of initiating a communication with a desired contact initially interacts with the wireless communication device 10 to indicate that voice-activated dialing is desired. Depending upon the nature of the device 10, this may involve depressing a button on the device 10 or selecting appropriate user interface controls displayed on the display 126 (FIG. 1). The user then utters the name of the desired contact followed by a disambiguation field identifier and a qualifier, e.g., "Jon Smith—Company—RIM". The user may know to specify a disambiguation field and qualifier at all times or to specify them if at least some homophone names are suspected to exist in the contacts database for example. Depending upon the capabilities of the employed voice recognition algorithm, the name, disambiguation field identifier and qualifier portions may or may not need to be separated by slight pauses.

The utterance 180 (audio) is received. From the utterance, digital representations of the name portion, disambiguation field identifier portion and qualifier portion of the utterance are generated. To achieve this, in the present embodiment a speaker-independent voice-recognition processing component 300 of voice recognition engine 200 first converts the utterance 180 into a digital representation 310 of the utterance. The nature and format of the digital representation 310 is dependent on which speech recognition algorithm or technique of a number of possible speech recognition algorithms/techniques is employed by the voice recognition engine 200. For example, if the speech recognition algorithm uses speech-to-text conversion, a well-known approach, then the digital representations may be text strings. Alternatively, if the speech recognition algorithm is phoneme-based, which is also well known, then the digital representations may be phoneme sequences. The speech recognition algorithms or techniques that could be used include, but are not limited to, those described in the following issued US patents, which are incorporated by reference hereinto: U.S. Pat. No. 5,202,952 "Large-vocabulary continuous speech prefiltering and processing system" (see, e.g., col:line 1:5 to 5:5); U.S. Pat. No. 5,724,481 "Method for Automatic Speech Recognition of Arbitrary Spoken Words" (see, e.g., col:line 4:65 to 5:40); U.S. Pat. No. 6,804,645 "Dynamic Phoneme Dictionary for Speech Recognition"; U.S. Pat. No. 6,604,076 "Speech Recognition Method for Activating a Hyperlink of an Internet Page" (see, e.g., col:line 5:20 to 5:67); or U.S. Pat. No. 6,138,098 "Command Parsing and Rewrite System". Most speech recognition techniques that could be employed involve receiving the user's speech as an analog signal via a microphone, passing the analog signal through an analog-to-digital (A/D) converter to transform the analog signal into a set of digital values, and applying various digital signal processing and filtering techniques to the digital values. The particulars of the employed speech recognition technique are known to those skilled in the art and are beyond the scope of the present disclosure.

After a digital representation 310 of the utterance has been created, parsing 320 of the utterance representation 310 is performed in order to extract: a digital name representation 322 corresponding to the name portion 182 ("Jon Smith"); a digital disambiguation field identifier representation 324 corresponding to the disambiguation field identifier portion 184 ("Company"); and a digital qualifier representation 326 corresponding to the qualifier portion 186 ("RIM") of the utterance 180. The nature of the parsing is, again, voice recognition algorithm-specific, and may for example include textual sub-string identification or phoneme group extraction.

Further processing is then performed upon the digital name representation 322, digital disambiguation field identifier representation 324 and digital qualifier representation 326 for the purpose of uniquely identifying the desired record 190 within the contacts database 210. This processing 340 may involve identifying, based on the digital name representation 322, a set of candidate records 220 (FIG. 2) from the contacts database 210, where each candidate record has a name field 232 that matches the digital name representation 322. A match may occur either if the digital name representation 322 represents the exact same name as the name field 232 (e.g. as for record 224 in the present example) or represents a homophone name of the name field 232 (e.g. as for records 222, 226). The particulars of the matching process again depend upon the employed speech recognition algorithm or technique. For example, if the digital representations 322, 324 and 326 are text strings, matching may involve comparing text strings to the text of corresponding database fields. If the digital representations 322, 324 and 326 are phoneme sequences, matching may involve conversion of corresponding database fields into phoneme representations and comparing phonemes to phonemes. Regardless of the employed matching process, the identification of a set of candidate records involves communication with the contacts database 210, as represented in FIG. 3 by arrow 250. The communication may be by way of a database management system (DBMS). The nature of the communication is database-specific and/or DBMS-specific and will be known to those skilled in the art.

Thereafter, the digital disambiguation field identifier representation 324 is used to identify one of the fields of the database 210 as a disambiguation field. For example, the digital representation 324 of "Company" may be compared to stored digital representations of each field name of contacts database 210, so as to identify the "Company" field 234 (FIG. 2) as the disambiguation field by virtue of its matching name. The set of records 220 is then examined to identify a record whose disambiguation field 234 matches the digital qualifier representation 326 (corresponding to "RIM" in the present example). Thus, record 224 is identified as the desired record 190 on that basis. It will be appreciated that no disambiguation is necessary if the identified candidate set of records 220 contains only one record.

Subsequently, the communication address 236 contained in the desired record 190 is identified and used by the voice communication module 130A (FIG. 1) to automatically initiate a communication with the desired contact. In the present example, the communication address is a telephone number, thus the initiation of communication is a dialing of the telephone number. The dialing may be achieved by way of a conventional dialer component of the wireless communication device 10 (not illustrated). Advantageously, the telephone number is dialed on the basis of the single utterance 180, and the user is not required to wait for prompts for specifying disambiguation information. In alternative embodiments, the communication address may be something other than a telephone number, such as an email address or instant messaging username for example. The automatic initiation of a communication would of course be suitable for the relevant communication address.

As will be appreciated by those skilled in the art, modifications to the above-described embodiment can be made without departing from the essence of the invention. For example, alternative embodiments may employ fields other than the company name field 234 as disambiguation fields. Any of a department field, email address field, city field, state or province field, or country field may be used as a disambiguation field, to name but a few.

Some embodiments may be capable of distinguishing a spoken qualifier from a spoken name even when the utterance lacks a spoken disambiguation field identifier. For example, the qualifier portion of the utterance may be distinguished from the name portion of the utterance by way of a slight pause in the utterance for example (e.g. "John Smith . . . RIM"). Moreover, it may be predetermined that the qualifier represents a value of a particular that is always used to disambiguate a spoken name from any homophone names.

It should be appreciated that the data flow diagram of FIG. 3 is in part dependent upon the operative voice recognition algorithm or technique and is not necessarily representative of all voice recognition techniques that could be used within voice recognition engine 200. For example, it is not absolutely necessary for utterance 180 to first be fully converted into a digital representation 310 and only then parsed into digital representations 322, 324 and 326 of the name, disambiguation field identifier and qualifier (respectively). In some approaches, the utterance 180 may be converted directly into representations 322, 324 and 326. In this case, parsing and conversion may be performed simultaneously or in lockstep.

Other modifications will be apparent to those skilled in the art and, therefore, the invention is defined in the claims.

What is claimed is:

1. A method comprising:
receiving a single utterance having a name portion, a disambiguation field identifier portion and a qualifier portion, the name portion representing a spoken name of a desired contact of a contacts database, the disambiguation field identifier portion for identifying a database field of the contacts database, distinct from a name field of the contacts database, to be used as a disambiguation field, the qualifier portion representing a spoken word or words for disambiguating the name of the desired contact from any homophone names in the contacts database;
generating from the utterance a digital name representation corresponding to the name portion, a digital disambiguation field identifier representation corresponding to said disambiguation field identifier portion and a digital qualifier representation corresponding to the qualifier portion; and
processing the digital name representation, digital disambiguation field identifier representation and the digital qualifier representation to uniquely identify, without prompting for any further disambiguation information, the desired contact within the contacts database, wherein said processing comprises:
based on the digital name representation, identifying a set of candidate records from said contacts database, each of said candidate records having a name field value which represents the same name as said digital name representation or represents a homophone name of said digital name representation;
based on said digital disambiguation field identifier representation, determining which database field common to said set of candidate records shall serve as said disambiguation field, the disambiguation field being distinct from the name field of the contacts database; and
based on said digital qualifier representation, identifying a record representing the desired contact from said set of candidate records, said identifying said record comprising searching for a record in said set of candidate records whose disambiguation field value matches said digital qualifier representation.

2. The method of claim 1 wherein said generating comprises:
converting the utterance to a digital representation of the utterance; and
parsing the digital representation of the utterance to extract said digital name representation and said digital qualifier representation.

3. The method of claim 2 wherein said digital representation of the utterance comprises a textual representation of the utterance, said digital name representation comprises a name text string, said digital qualifier representation comprises a qualifier text string, and wherein said processing comprises comparing said name text string and said qualifier text string to text strings contained in records of said contacts database.

4. The method of claim 2 wherein said digital representation of the utterance comprises a phoneme sequence representation of the utterance, said digital name representation comprises a name phoneme sequence, said digital qualifier representation comprises a qualifier phoneme sequence, and wherein said processing comprises comparing said name phoneme sequence and said qualifier phoneme sequence to phoneme sequence representations of data contained in records of said contacts database.

5. The method of claim 1 wherein said digital disambiguation field identifier representation is one of a textual disambiguation field identifier representation and a phonetic disambiguation field identifier representation.

6. The method of claim 1 wherein said identified record contains a unique communication address of said contact and further comprising automatically initiating a communication with said desired contact using said unique communication address.

7. The method of claim 6 wherein said unique communication address is a telephone number and wherein said initiating comprises dialing said telephone number.

8. The method of claim 1 wherein said disambiguation field is selected from the set consisting of a company name field, a department field, an email address field, a city field, a state or province field, and a country field.

9. A non-transitory machine-readable medium storing machine-executable code that, when executed by a processor of a computing device, causes said device to:

receive a single utterance having a name portion, a disambiguation field identifier portion and a qualifier portion, the name portion representing a spoken name of a desired contact of a contacts database, the disambiguation field identifier portion for identifying a database field of the contacts database, distinct from a name field of the contacts database, to be used as a disambiguation field, the qualifier portion representing a spoken word or words for disambiguating the name of the desired contact from any homophone names in the contacts database;

generate from the utterance a digital name representation corresponding to the name portion, a digital disambiguation field identifier representation corresponding to said disambiguation field identifier portion and a digital qualifier representation corresponding to the qualifier portion; and process the digital name representation, digital disambiguation field identifier representation and the digital qualifier representation to uniquely identify, without prompting for any further disambiguation information, the desired contact within the contacts database, wherein said processing comprises:

based on the digital name representation, identifying a set of candidate records from said contacts database, each of said candidate records having a name field value which represents the same name as said digital name representation or represents a homophone name of said digital name representation;

based on said digital disambiguation field identifier representation, determining which database field common to said set of candidate records shall serve as said disambiguation field, the disambiguation field being distinct from the name field of the contacts database; and based on said digital qualifier representation, identifying a record representing the desired contact from said set of candidate records, said identifying said record comprising searching for a record in said set of candidate records whose disambiguation field value matches said digital qualifier representation.

10. The machine-readable medium of claim 9 wherein said generating comprises:

converting the utterance to a digital representation of the utterance; and parsing the digital representation of the utterance to extract said digital name representation and said digital qualifier representation.

11. The machine-readable medium of claim 10 wherein said digital representation of the utterance comprises a textual representation of the utterance, said digital name representation comprises a name text string, said digital qualifier representation comprises a qualifier text string, and wherein said processing comprises comparing said name text string and said qualifier text string to text strings contained in records of said contacts database.

12. The machine-readable medium of claim 10 wherein said digital representation of the utterance comprises a phoneme sequence representation of the utterance, said digital name representation comprises a name phoneme sequence, said digital qualifier representation comprises a qualifier phoneme sequence, and wherein said processing comprises comparing said name phoneme sequence and said qualifier phoneme sequence to phoneme sequence representations of data contained in records of said contacts database.

13. The machine-readable medium of claim 9 wherein said digital disambiguation field identifier representation is one of a textual disambiguation field identifier representation and a phonetic disambiguation field identifier representation.

14. The machine-readable medium of claim 9 wherein said identified record contains a unique communication address of said contact and further comprising automatically initiating a communication with said desired contact using said unique communication address.

15. The machine-readable medium of claim 14 wherein said unique communication address is a telephone number and wherein said initiating comprises dialing said telephone number.

16. The machine-readable medium of claim 9 wherein said disambiguation field is selected from the set consisting of a company name field, a department field, an email address field, a city field, a state or province field, and a country field.

17. A computing device comprising:

a processor; and memory in communication with said processor storing machine-executable code that, when executed by said processor, causes said device to:

receive a single utterance having a name portion, a disambiguation field identifier portion and a qualifier portion, the name portion representing a spoken name of a desired contact of a contacts database, the disambiguation field identifier portion for identifying a database field of the contacts database, distinct from a name field of the contacts database, to be used as a disambiguation field, the qualifier portion representing a spoken word or words for disambiguating the name of the desired contact from any homophone names in the contacts database;

generate from the utterance a digital name representation corresponding to the name portion, a digital disambiguation field identifier representation corresponding to said disambiguation field identifier portion and a digital qualifier representation corresponding to the qualifier portion; and process the digital name representation, digital disambiguation field identifier representation and the digital qualifier representation to uniquely identify, without prompting for any further disambiguation information, the desired contact within the contacts database, wherein said processing comprises:

based on the digital name representation, identifying a set of candidate records from said contacts database, each of said candidate records having a name field value which represents the same name as said digital name representation or represents a homophone name of said digital name representation;

based on said digital disambiguation field identifier representation, determining which database field common to said set of candidate records shall serve as said disambiguation field, the disambiguation field being distinct from the name field of the contacts database; and based on said digital qualifier representation, identifying a record representing the desired contact from said set of candidate records, said identifying said record comprising searching for a record in said set of candidate records whose disambiguation field value matches said digital qualifier representation.

18. The method of claim 1 wherein said spoken name comprises a first and a last name of a person.

19. The machine-readable medium of claim 9 wherein said spoken name comprises a first and a last name of a person.

20. The computing device of claim 17 wherein said spoken name comprises a first and a last name of a person.

* * * * *